March 17, 1931.  J. D. RAUCH  1,796,958
POWER DIPPER TRIP
Filed Aug. 1, 1928  2 Sheets-Sheet 1
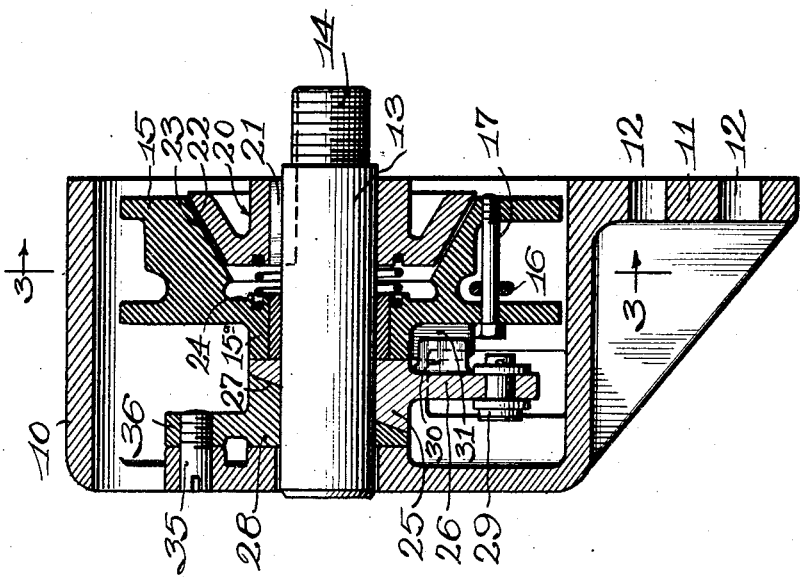
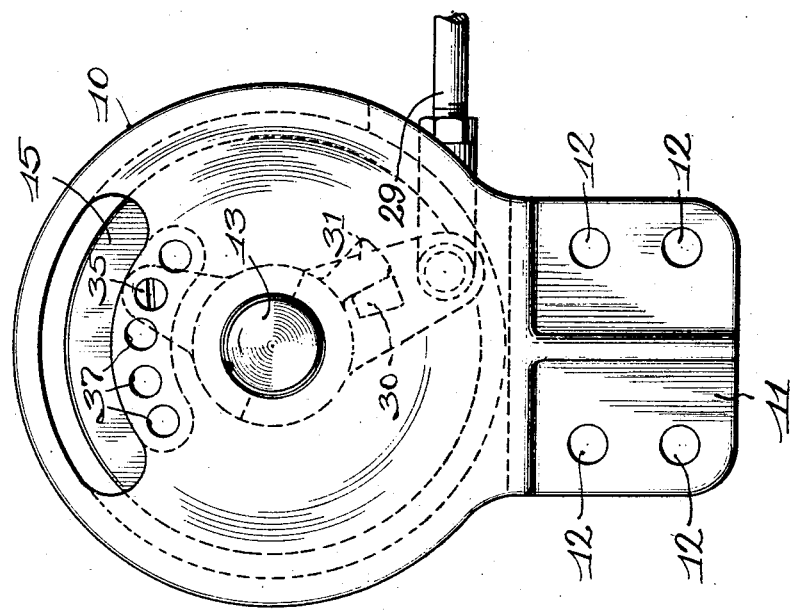
Witness:
Chas. R. Koursh
Inventor,
John D. Rauch

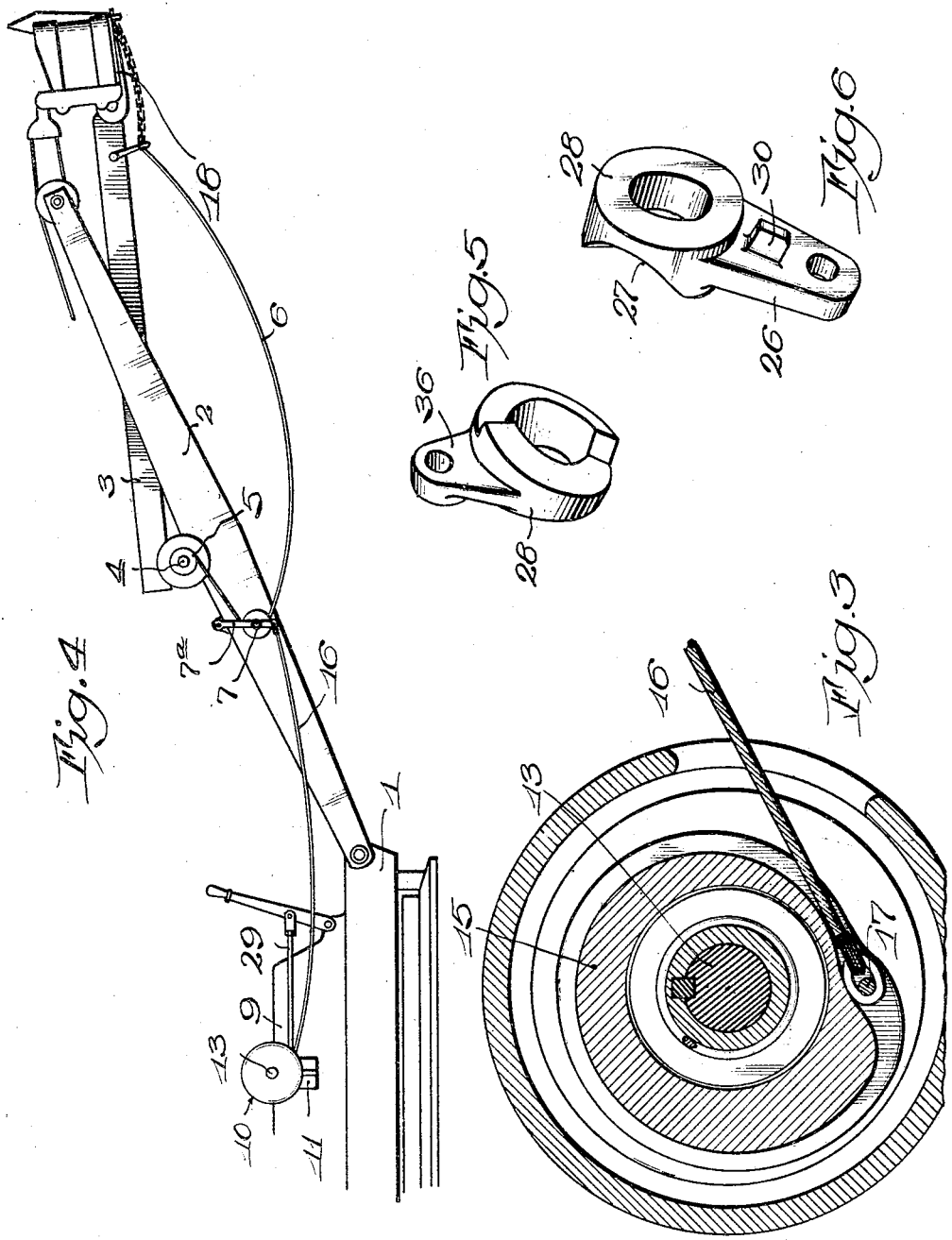

Patented Mar. 17, 1931

1,796,958

UNITED STATES PATENT OFFICE

JOHN D. RAUCH, OF LIMA, OHIO, ASSIGNOR TO THE OHIO POWER SHOVEL COMPANY, OF LIMA, OHIO, A CORPORATION OF OHIO

POWER DIPPER TRIP

Application filed August 1, 1928. Serial No. 296,690.

This invention relates to improvements in dipper tripping devices for power shovels, and has for its principal object to provide a simple and efficient mechanism, operated by power of the main operating motor, to impart a jerk to the dipper tripping rope for releasing the dipper latch, and thus relieve the operator from much of the manual effort heretofore required for this purpose. A further object is to provide a device of the character described which may be applied as an attachment to power shovels, if desired.

The invention may best be understood by reference to the accompanying drawings, in which Figure 1 is a side view of a device constructed in accordance with my invention.

Figure 2 is a sectional view taken on line 2—2 of Figure 1.

Figure 3 is a section taken on line 3—3 of Figure 2.

Figure 4 is a fragmentary view showing my device as applied to a power shovel.

Figure 5 is a detail view showing the adjustable cam bearing, and

Figure 6 is a detail view showing the clutch-engaging lever.

Referring to details of the embodiment illustrated in the drawings and as applied to a power shovel as shown in Figure 4, said power shovel includes a base 1 having a boom 2 suitably supported thereon, and a dipper including a handle 3 operated by a shipper shaft 4 in the usual manner. A drum or spool 5 is mounted on the shipper shaft and has a rope 6 carried thereon which extends rearwardly about a sheave 7 on a pendulum arm 7a mounted on the boom 2 as shown. The front end of the rope 6 extends to the dipper latch 18 and is arranged for disengaging said latch in the usual manner. With this construction the rope 6 is taken up or paid out automatically in the usual manner as the dipper handle 3 is moved longitudinally relative to the shipper shaft 4.

The tripping device forming the subject matter of my present invention includes a casing 10 having a bracket 11 provided with suitable means, such as bolt holes 12, 12, for attachment to a shaft bearing support 9 in position to couple the drive shaft 13 directly to the end of a power shaft (not shown) by any suitable connecting means, as for instance by the projecting threaded end 14 on said shaft. The power shaft and its driving connections may be of any suitable design and are not shown in detail herein as they form no part of the present invention.

Referring now more particularly to the construction of the attachment, my device includes a drum 15 upon which the tripping rope 16 is adapted to be wound. The tripping rope 16 is attached by suitable means to the drum 15, as by bolt 17, and is connected to the lower end of the pendulum arm 7a. The arrangement is such that by exerting a jerk upon the rope 16 tension is produced upon the rope 6 for disengaging the dipper latch 18 in all permissible positions of the dipper. The drum 15 has a hub 15a loosely mounted on the central portion of shaft 13. A clutch member 20 is fixed on the shaft 13 as by key 21, and is adapted to have driving engagement with the drum 15, as for instance, by means of frictional engagement, the clutch shown herein being of the cone type in which the drum 15 is provided with an outwardly flared portion 22 engaged by the cone 23 of the clutch member 20.

Means are provided for normally maintaining the parts out of frictional engagement with each other, as for instance, by means of a coil spring 24 interposed between the clutch member 20 and hub 15a of said drum.

The clutch is positively engaged by means of a sleeve 25 having a lever arm 26 manually shiftable by control rod 29. Said sleeve has its rear face provided with cam surfaces 27 which engage corresponding cam surfaces on a base plate 28.

A projecting lug 30 is formed on the inner face of lever 26 in position to engage a coacting knock-out lug 31 formed on the opposing face of the drum 15.

The drive shaft 13 is normally rotated in a clockwise direction, as seen in Figure 1, and the arrangement is such that when the operator shifts the sleeve 25 in a counter-clockwise direction, the cam surface 27 causes the drum 15 to be moved longitudinally of the shaft 13 into engagement with the clutch member 20. The drum 15 is then rotated through a complete revolution, which is sufficient to impart the desired jerk upon the tripping rope 16, but after completing a single revolution, the knock-out lug 31 on the drum 15 engages the lug 30 on lever arm 26, as indicated in Figure 1, so as to automatically shift said sleeve 25 and control rod 29 to their initial position, and thereby cause the drum to be moved out of driving engagement with the clutch member 20.

During the single revolution of the drum, as described, it will be understood that the rope thereon is put under tension so as to trip the dipper, but as soon as the driving connection is discontinued, the weight of the rope suspended between the drum and dipper latch 18 is sufficient to cause the latter to unwind itself from the drum by gravity, and thus restore the drum to its initial position with the knock-out lug 31 at the opposite side of the lug 30, ready for the next tripping operation of the device.

The base plate 28 herein shown comprises a separate sleeve having angular adjustment on the shaft 13 so as to take up wear on the clutch and cam surfaces, as required. Several positions of adjustment are afforded by means of a locking pin 35 engaging an arm 36 carried by the base plate 28 and adapted to register with one of several locking holes 37, 37 formed in the casing 10, as clearly shown in Figures 1 and 2.

In the preferred form shown the periphery of the drum 15 is substantially spiral in shape, as indicated in Figure 3, this arrangement being preferred in order to increase the rapidity of action of the device. It will be understood however, that the size and shape of the drum may vary widely, depending upon the amount of movement required.

Although I have illustrated and described the particular embodiment of my invention, it will be understood that I do not wish to be limited to the exact construction shown and described, but that various changes and modifications may be made without departing from the spirit and scope of my invention.

I claim:

1. In a device of the character described, and in combination with a power shovel having a power driven shaft and a dipper trip rope, a drum for said rope, means for selectively connecting said drum with said power shaft, means on said drum for positively disengaging said connecting means after limited rotation of said drum, said drum being free to return to its initial position by the unwinding of said tripping rope therefrom.

2. In a device of the character described, and in combination with a power shovel having a power driven shaft and a dipper trip rope, a drum for said rope, means for selectively connecting said drum with said power shaft to wind said rope on said drum, means for automatically disconnecting said drum from said shaft after limited rotation thereof, the periphery of said drum being of increasing radius in the direction of rotation thereof.

3. In a device of the character described, and in combination with a power shovel having a power driven shaft and a dipper trip rope, a drum for said rope, means affording selective connection between said drum and said shaft, comprising friction clutch members normally maintained in inoperative relation, rotating cam means for moving said friction clutch members into engagement with each other, and means rotatable with the driven clutch member for automatically moving said cam means into inoperative position after limited rotation of said drum.

4. In a device of the character described, and in combination with a power shovel having a power driven shaft and a dipper trip rope, a drum for said rope, means affording selective connection between said drum and said shaft, comprising friction clutch members normally maintained in inoperative relation, rotating cam means for moving said friction clutch members into engagement with each other, means rotatable with the driven clutch member for automatically moving said cam means into inoperative position after limited rotation of said drum, said drum thereupon being free to be rotated in a reverse direction to its initial position by the unwinding of said tripping rope therefrom.

5. In combination with a power shovel having a power driven shaft and a dipper trip rope, a bracket having a stub shaft adapted to be connected with said power shaft, a friction clutch member fixed on said stub shaft, a drum for said rope loosely mounted on said stub shaft and movable longitudinally thereon for driving engagement with said friction clutch member, means normally maintaining said drum out of driving engagement, a cam member rotatably mounted on said shaft and adapted upon rotation to move said drum into driving engagement with said clutch member, and means carried by said drum for engaging said cam member after limited rotation of said drum for returning said cam member to inoperative position and thereby releasing said clutch.

6. In combination with a power shovel having a power driven shaft and a dipper trip rope, a bracket having a stub shaft adapted to be connected with said power shaft, a friction clutch member fixed on said stub shaft, a drum for said rope loosely mounted on said stub shaft and movable longitudinally thereon for driving engagement with said friction clutch member, means normally maintaining said drum out of driving engagement, a cam member rotatably mounted on said shaft and adapted upon rotation to move said drum into driving engagement with said clutch member, and means carried by said drum for engaging said cam member after limited rotation of said drum for returning said cam member to inoperative position and thereby releasing said clutch, said drum thereupon being free to be rotated in reverse direction to its initial position by the unwinding of said tripping rope therefrom.

Signed at Lima, Ohio, this 29th day of July, 1928.

JOHN D. RAUCH.